(12) United States Patent
Cravens et al.

(10) Patent No.: US 7,444,466 B2
(45) Date of Patent: Oct. 28, 2008

(54) IMPLEMENTING FEEDBACK DIRECTED DEFERRAL OF NONESSENTIAL DASD OPERATIONS

(75) Inventors: Larry J. Cravens, Pine Island, MN (US); Jay Paul Kurtz, Rochester, MN (US); Kenneth Gerald Linn, Rochester, MN (US); Glen W. Nelson, Rochester, MN (US); Kenneth Charles Vossen, Rochester, MN (US); Donald L. Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 11/360,349

(22) Filed: Feb. 23, 2006

(65) Prior Publication Data

US 2007/0198774 A1   Aug. 23, 2007

(51) Int. Cl.
*G06F 12/00* (2006.01)
*G06F 13/00* (2006.01)
*G06F 13/28* (2006.01)

(52) U.S. Cl. .................. 711/112; 711/150; 711/151; 711/152; 711/168

(58) Field of Classification Search .................. 711/112
See application file for complete search history.

(56) References Cited

U.S. PATENT DOCUMENTS

| 4,620,278 | A * | 10/1986 | Ellsworth et al. | 710/119 |
| 6,442,648 | B1 * | 8/2002 | Genduso et al. | 711/112 |
| 2006/0047897 | A1 * | 3/2006 | Thiessen et al. | 711/112 |
| 2006/0288184 | A1 * | 12/2006 | Riska et al. | 711/167 |

* cited by examiner

*Primary Examiner*—Kevin Ellis
*Assistant Examiner*—Ryan Bertram
(74) *Attorney, Agent, or Firm*—Joan Pennington

(57) ABSTRACT

A method, apparatus and computer program product are provided for implementing feedback directed deferral on nonessential direct access storage device (DASD) operations. A kernel DASD I/O manager maintains a queue depth count value for a DASD unit and maintains a busy flag that indicates when the queue depth count value is greater than a predefined threshold. The kernel DASD I/O manager defers optional operations responsive to the busy flag being set for the DASD unit.

6 Claims, 4 Drawing Sheets

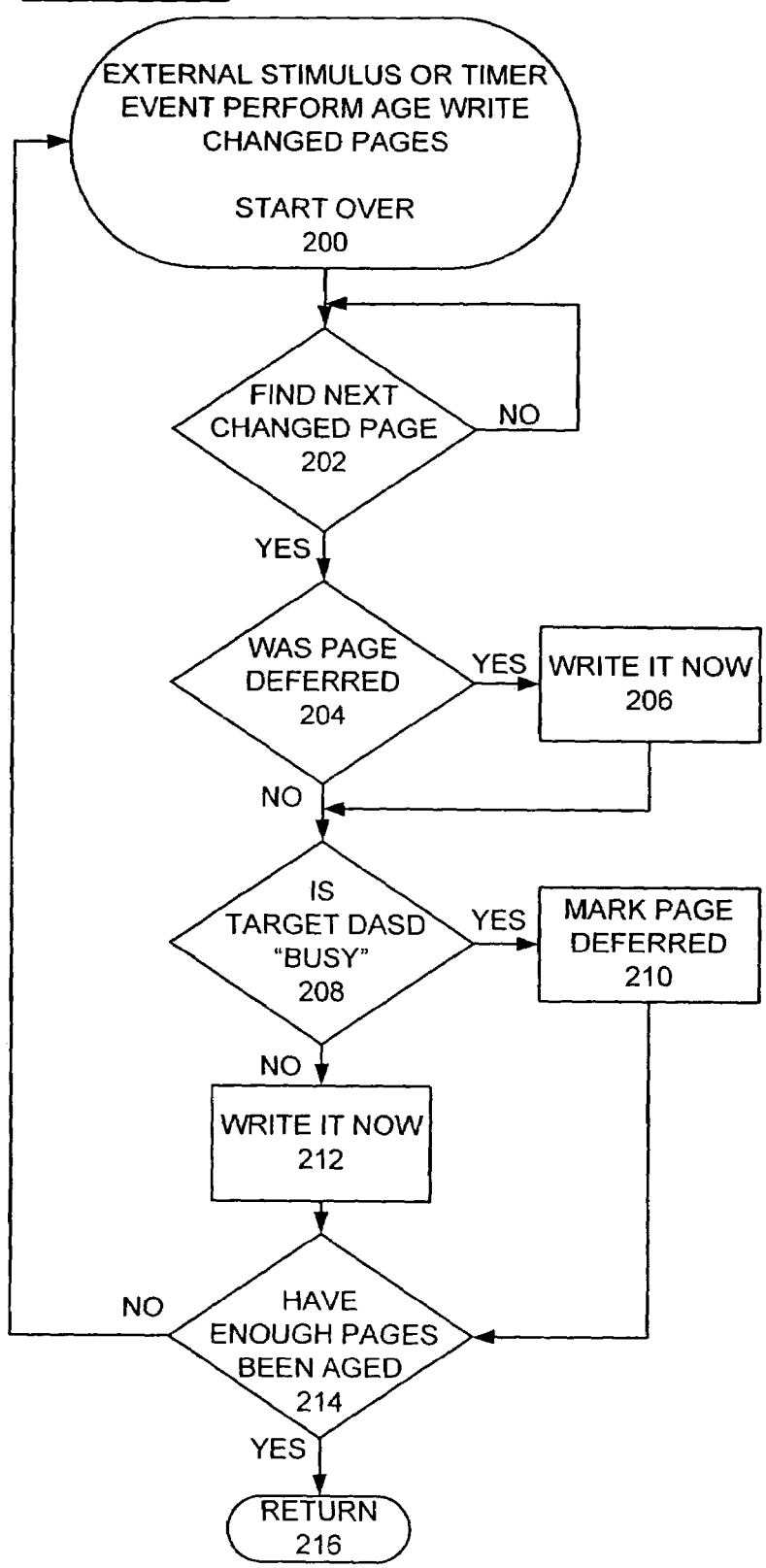

US 7,444,466 B2

IMPLEMENTING FEEDBACK DIRECTED DEFERRAL OF NONESSENTIAL DASD OPERATIONS

FIELD OF THE INVENTION

The present invention relates generally to the data processing field, and more particularly, relates to a method, apparatus and computer program product for implementing feedback directed deferral on nonessential direct access storage device (DASD) operations.

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. All DASD units must have a method to position each data head over the proper radial location to write a track and again, to position it very close to the same location to read the track.

Providing any improvement in DASD I/O subsystem performance remains an ongoing challenge. A need exists for an effective mechanism to provide enhanced DASD I/O subsystem performance.

SUMMARY OF THE INVENTION

Principal aspects of the present invention are to provide a method, apparatus and computer program product for implementing feedback directed deferral on nonessential direct access storage device (DASD) operations. Other important aspects of the present invention are to provide such method, apparatus and computer program product for implementing feedback directed deferral on nonessential direct access storage device (DASD) operations substantially without negative effect and that overcome many of the disadvantages of prior art arrangements.

In brief, a method, apparatus and computer program product are provided for implementing feedback directed deferral on nonessential direct access storage device (DASD) operations. A kernel DASD I/O manager maintains a queue depth count value for a DASD unit and maintains a busy flag that indicates when the queue depth count value is greater than a predefined threshold. The kernel DASD I/O manager defers optional operations responsive to the busy flag being set for the DASD unit.

In accordance with features of the invention, optional operations include writing changed pages to the DASD for freeing up a main store memory, when highly referenced changed pages are aged to DASD, and when large read-aheads are requested by such applications as a database manager.

In accordance with features of the method of the invention, for all changed pages in memory, checking is performed to determine whether the page is deferred. If the page is deferred, then the deferred page is written. Checking is performed to determine whether the DASD unit is busy. If the DASD unit is busy, then the page is marked as deferred. Otherwise if the DASD unit is not busy, then the page is written. Checking whether enough pages have been aged is determined. If not enough pages have been aged, then the sequential steps return to start over. Otherwise, when enough pages have been aged, then the sequential steps return so that the sequential aging steps will later resume responsive to a predefined event, such as an external stimulus or a timer event.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a flow chart illustrating exemplary steps of methods for implementing feedback directed deferral on nonessential direct access storage device (DASD) operations in accordance with the preferred embodiment.

DETAILED DESCRIPTION OF THE PREFERRED EMBODIMENTS

In accordance with features of the invention, methods are provided for feedback directed deferral on nonessential direct access storage device (DASD) operations. In virtual memory systems, the Operating System's Virtual Memory Manager can initiate two types of disk operations: reads and writes that are performed at the time of request; and reads and writes that are optional. Examples of disk operations that are performed at the time of request include a read due to a page fault, a write to database journal to commit a database change. Examples of optional DASD I/Os include when the virtual memory manager is freeing up main store, such as by writing changed pages to disk, when highly referenced changed pages are aged to DASD, and when large read-aheads are requested by such applications as a database manager.

Figure 1A:
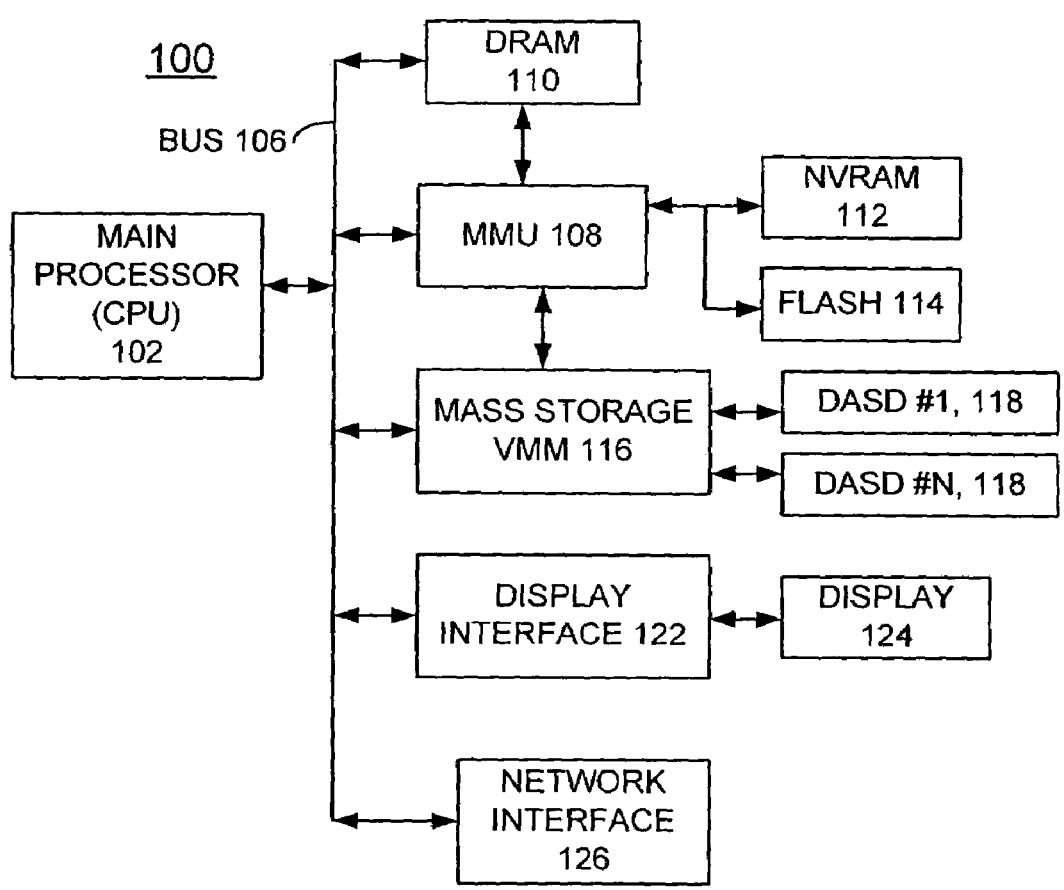
FIGS. 1A and 1B together provide a schematic diagram of an exemplary computer system and operating system for implementing feedback directed deferral on nonessential direct access storage device (DASD) operations in accordance with the preferred embodiment.
Figure 1B:
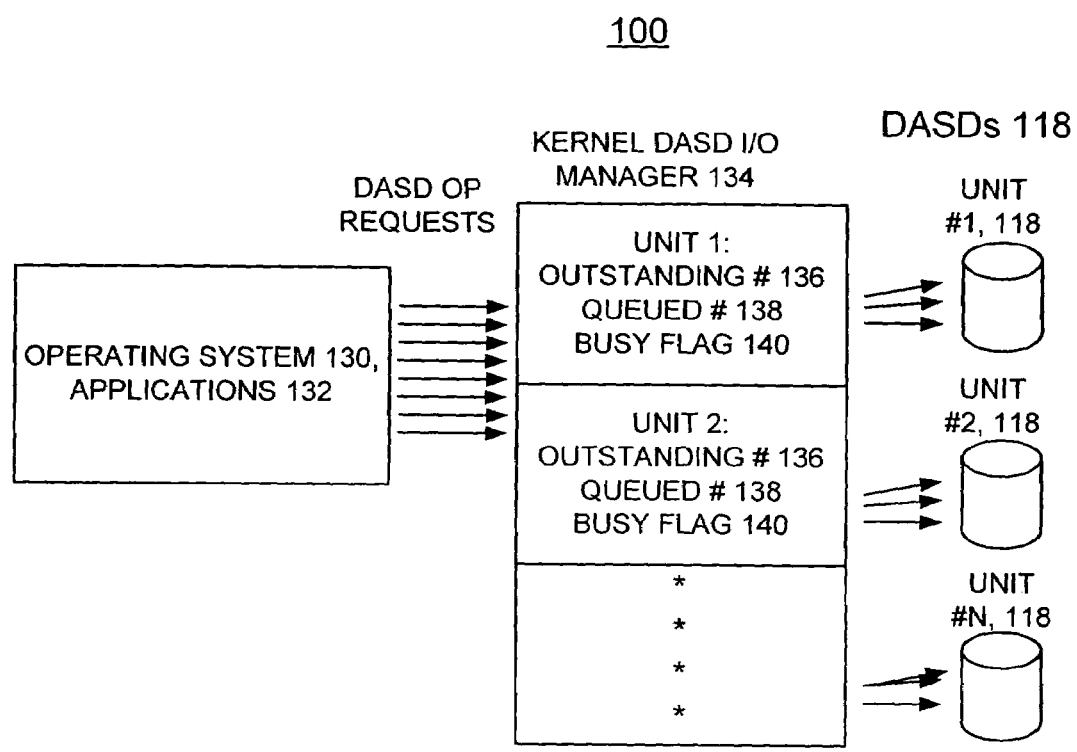

Having reference now to the drawings, in FIGS. 1A and 1B, there is shown a computer system generally designated by the reference character 100 for implementing methods for feedback directed deferral on nonessential direct access storage device (DASD) operations in accordance with the preferred embodiment. Computer system 100 includes a main processor 102 or central processor unit (CPU) 102 coupled by a system bus 106 to a memory management unit (MMU) 108 and system memory including a main store or dynamic random access memory (DRAM) 110, a nonvolatile random access memory (NVRAM) 112, and a flash memory 114. A mass storage memory management unit (MMU) 116 coupled to the system bus 106 and MMU 108 connects a plurality of direct access storage devices (DASDs) 118 to the main processor 102. Computer system 100 includes a display interface 122 connected to a display 124, and a network interface 126 coupled to the system bus 106.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, instead of a single main processor 102, multiple main processors can be used.

As shown in FIG. 1B, computer system 100 includes an operating system 130 and a plurality of applications 132 together applying multiple DASD operational requests or ops to the multiple DASDs #1-N, 118 via a kernel DASD I/O manager 134 of the preferred embodiment coupled to the multiple DASDs #1-N, 118.

In accordance with features of the invention, a feedback mechanism is incorporated from the kernel DASD I/O manager 134 or DASD I/O subsystem manager to the Virtual Memory Manager (VMM) or mass storage VMM 116. The feedback is an indication of the degree of busyness of individual DASD unit resources of the multiple DASDs #1-N, 118. When the VMM 116 is about it issue a DASD operation of the optional nature, the VMM first examines this feedback mechanism. If the particular target DASD unit of DASDs #1-N, 118 is currently very busy, the VMM 116 will either not start this optional I/O, or delay the start of this optional I/O.

The purpose of the kernel DASD I/O manager 134 of the preferred embodiment is to start and control the physical DASD ops sent to the multiple DASDs #1-N, 118. The kernel DASD I/O manager 134 receives a myriad of operational requests from operating system (OS) 130 and applications 132 and applies the operational requests to DASDs #1-N, 118. The kernel DASD I/O manager 134 maintains an outstanding # 136 and a queued # 138 of operational requests, and a busy flag 140. The kernel DASD I/O manager 134 maintains for each of the DASDs #1-N, 118, a count of a queue depth or busy flag 140 indicating how busy each DASD unit currently is. The count of the queue depth is compared with a predefined threshold and the busy flag 140 is set responsive to the count being greater than the predefined threshold.

System 100 includes volatile RAM or DRAM 110 and the multiple DASDs #1-N, 118 maintain the persistence of data, such as application database tables. While the OS 130 and applications 132 are manipulating data, the data is in DRAM 110. Generally all updated, changed or new data must eventually be written to the backing-store DASDs #1-N, 118.

In system 100, DASD writes requests that fall into two categories including:
1) those requests that have to be performed now; and
2) those requests that should, but do not have to be performed now or optional requests.

Most write requests of the OS 130 and applications 132 fall into category 1 that must be performed now. For example: when a transaction is committed to journal and the DB, the new and changed data must be written to DASD 118 because if the system crashed, and the content of RAM would be lost, the new and changed data must be preserved.

In accordance with features of the invention, the deferred type of DASD write requests or those that do not have to be performed now can include several types of scenarios. One type is that the kernel DASD I/O manager 134 exposes an option to the rest of the OS 130 or Applications 132 that exposes a deferred or sloppy write option. Suppose an application 132 is creating a huge temporary index over a DB table. Application 132 might want to perform DASD writes on these pages in order to free up RAM for additional data. Because the data is temporary, and does not need to be preserved if the system crashed, the DASD writes do not have to be done or at least they do not have to be done right now. A much more common scenario of category 2 involves the Kernel's Virtual Memory Page Manager. This Manager constantly is assessing the health of RAM, by detecting how many RAM pages are free and available for new data, and how many are changed, as compared to the DASD image, and must be written to DASD 118 before the RAM can be freed up. This Manager can automatically request that RAM changed pages be written out to DASD. This is called Page Aging. Note that the real requirements of Page Aging is to free up RAM for potential new inbound data and to prevent some changed virtual pages from hogging RAM for extended periods of time. In this scenario, there is not a specific requirement to write any specific virtual memory page to DASD. There is only a requirement to write some number or percentage. This invention exploits the lack of that specific requirement. By adding in a test to see how busy the target DASD unit is, and if it is busy, deferring the write for some period of time, or until the next period of assessing RAM health.

Referring now to FIG. 2, there are shown exemplary steps of methods for implementing feedback directed deferral on nonessential direct access storage device (DASD) operations in accordance with the preferred embodiment. The sequential steps begin for implementing feedback directed deferral on nonessential direct access storage device (DASD) operations in accordance with the preferred embodiment as indicated in a block 200 indicated START OVER. The sequential steps begin responsive to an external stimulus or is timer driven for the page aging or aged write of changed page to be performed.

First for all changed pages in memory as indicated in a decision block 202, checking is performed to determine whether the page was deferred as indicated in a decision block 204. If the page was deferred, then the deferred page is written as indicated in a block 206. Checking is performed to determine whether the DASD unit is busy as indicated in a decision block 208. If the DASD unit is busy, then the page is marked as deferred as indicated in a block 210. Otherwise if the DASD unit is not busy, then the page is written as indicated in a block 212. Checking whether enough pages have been aged is determined as indicated in a decision block 214. If not enough pages have been aged, then the sequential steps return to block 200 to START OVER. Otherwise, the when enough pages have been aged, then the sequential steps return as indicated in a block 216, so that the sequential steps will later resume responsive to an external stimulus or a timer event.

Figure 3:
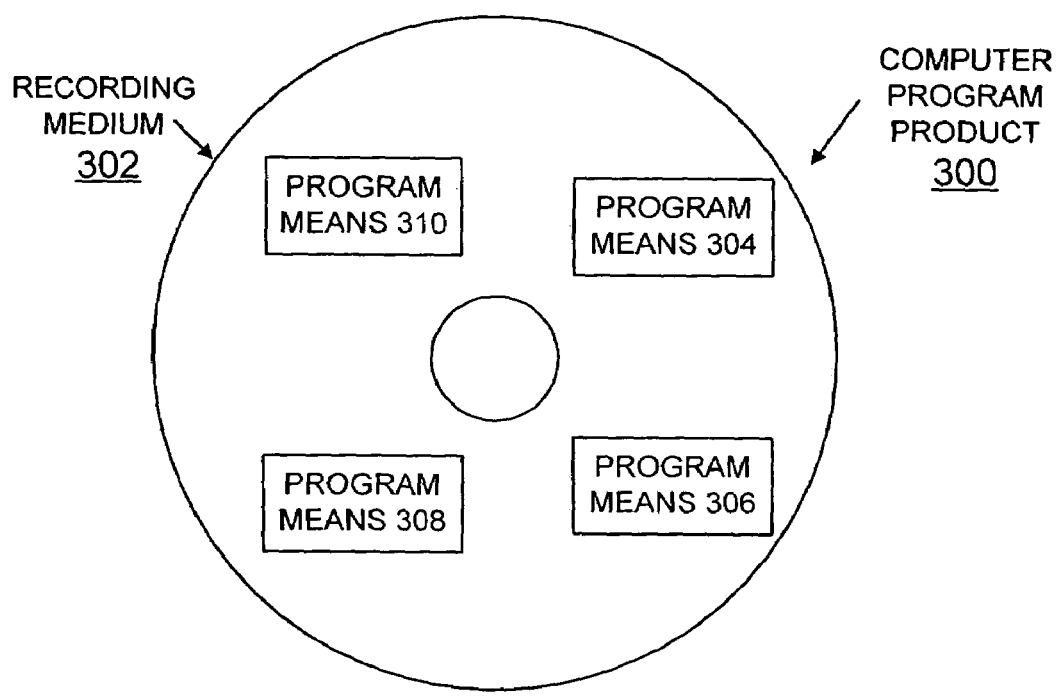
FIG. 3 is a block diagram illustrating a computer program product in accordance with the preferred embodiment.

Referring now to FIG. 3, an article of manufacture or a computer program product 300 of the invention is illustrated. The computer program product 300 includes computer readable storage media 302, such as, a floppy disk, a high capacity read only memory in the form of an optically read compact disk or CD-ROM, or a tape; a transmission type media such as a digital or analog communications link; or a similar computer program product. Recording medium 302 stores program means 304,306, 308,310 on the medium 302 for carrying out the methods for implementing feedback directed deferral on nonessential direct access storage device (DASD) operations of the preferred embodiment in the system 100 of FIGS. 1A and 1B.

A sequence of program instructions or a logical assembly of one or more interrelated modules defined by the recorded program means 304, 306, 308, 310, direct the computer system 100 for implementing feedback directed deferral on nonessential direct access storage device (DASD) operations of the preferred embodiment.

While the present invention has been described with reference to the details of the embodiments of the invention shown in the drawing, these details are not intended to limit the scope of the invention as claimed in the appended claims.

What is claimed is:
1. A computer implemented method for implementing feedback directed deferral on nonessential direct access storage device (DASD) operations comprising the steps of:
    maintaining a queue depth count value for a DASD unit;

setting a busy flag responsive to said queue depth count value being greater than a predefined threshold;

deferring optional operations responsive to the busy flag being set for the DASD unit;

identifying a changed page in memory and checking to determine whether the page is deferred, and writing the changed page responsive to the page being deferred.

2. The computer implemented method for implementing feedback directed deferral on nonessential direct access storage device (DASD) operations as recited in claim 1 includes responsive to the changed page not currently being deferred, checking to determine whether the DASD unit is busy, and responsive to the DASD unit being busy, marking the changed page as deferred.

3. The computer implemented method for implementing feedback directed deferral on nonessential direct access storage device (DASD) operations as recited in claim 2 includes writing the changed page responsive to the DASD unit not being busy.

4. The computer implemented method for implementing feedback directed deferral on nonessential direct access storage device (DASD) operations as recited in claim 1 wherein deferring optional operations responsive to the busy flag being set for the DASD unit include aging highly referenced changed pages to said DASD.

5. The computer implemented method for implementing feedback directed deferral on nonessential direct access storage device (DASD) operations as recited in claim 1 wherein deferring optional operations responsive to the busy flag being set for the DASD unit include writing changed pages to said DASD for freeing up a main store memory.

6. The computer implemented method for implementing feedback directed deferral on nonessential direct access storage device (DASD) operations as recited in claim 1 wherein deferring optional operations responsive to the busy flag being set for the DASD unit include deferring large read-aheads requested by an application of a computer system.

* * * * *